United States Patent [19]

Osterholt

[11] 4,010,596
[45] Mar. 8, 1977

[54] MOLDED PART SEPARATION AND STORAGE

[76] Inventor: Anthony H. Osterholt, 4608 Euclid Ave., Fort Wayne, Ind. 46806

[22] Filed: July 21, 1975

[21] Appl. No.: 597,822

[52] U.S. Cl. .................................. 53/123; 53/244; 83/167; 83/620
[51] Int. Cl.² .................. B65B 63/00; B26D 5/08
[58] Field of Search .................. 83/167, 620, 683; 53/123, 244, 246

[56] References Cited

UNITED STATES PATENTS

| | | | |
|---|---|---|---|
| 2,281,439 | 4/1942 | Heftler | 83/620 X |
| 2,392,459 | 1/1946 | Casalino | 83/620 |
| 3,065,584 | 11/1962 | Coleman | 53/244 X |
| 3,152,428 | 10/1964 | Hill | 53/246 X |
| 3,224,308 | 12/1965 | Dix | 83/167 X |

Primary Examiner—Travis S. McGehee
Attorney, Agent, or Firm—Gust, Irish, Jeffers & Rickert

[57] ABSTRACT

Method and apparatus for repetitively separating multiple molded parts from their common sprues and accumulating like parts from the same mold cavity in a storing and shipping tube is disclosed wherein a plurality of tubes are disposed parallel to one another and in substantially the same relative position as corresponding parts occupy on a sprue whereby a set of sprue supported parts may be severed from the sprue and forced into their respective tubes. The tubes are sheathlike having a cross section of generally the same configuration as the part they are to contain and have first opposed side wall portions for gripping parts and second opposed side wall portions separated from the parts and deformable toward one another to urge the first side wall portions away from one another thereby releasing the gripped parts.

8 Claims, 8 Drawing Figures

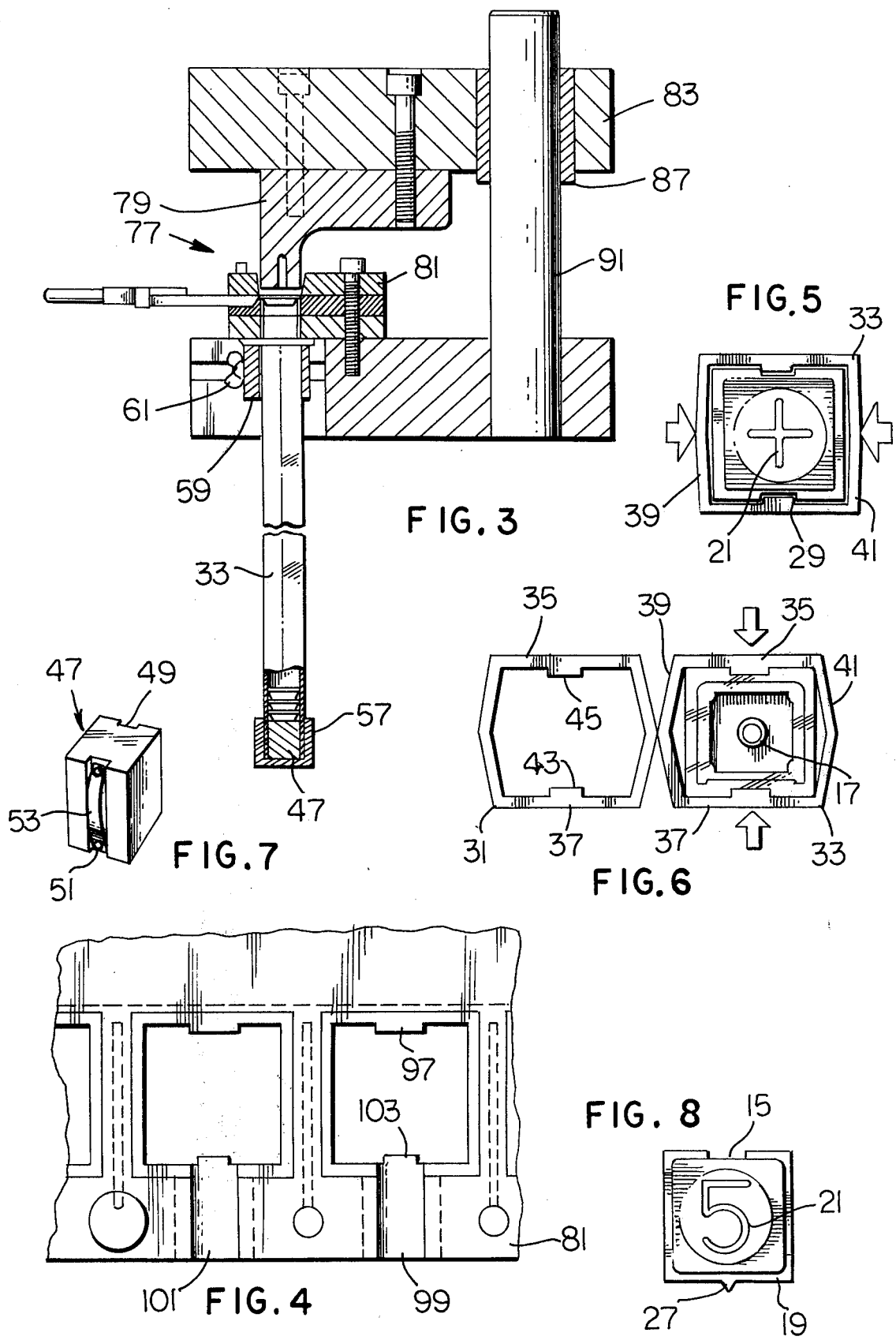

MOLDED PART SEPARATION AND STORAGE

BACKGROUND OF THE INVENTION

The present invention relates to the handling of small parts and more particularly to a method and apparatus for reducing or eliminating the need for handling such parts on an individual basis thereby significantly reducing the cost of a manufacturing process involving such parts. In an exemplary preferred embodiment the handling of small plastic activating keys for an electronic calculator will be described.

The advent of the small hand-held personal calculator has been spectacular and price competition keen. Typically keys for such calculators are injection molded often in more than one stage to provide plastic indicia of the function or numeral corresponding to a particular key in a color contrast to the plastic key background. The keys are generally rectangular or square with a peripheral flange or shoulders to hold them in place in a spring loaded manner beneath a calculator face plate and may have contact activating protuberances extending generally in their direction of actuation. For economy several keys, either identical or dissimilar, are molded simultaneously in a multicavity mold and when removed therefrom the several keys are all still attached to a common sprue. This sprue or waste portion formed in the passageways leading from the material source to the individual key cavities is generally somewhat tree-like in configuration with individual keys at the ends of the branches. Individual keys or buttons are then broken free from the sprue, any extending sprue remnant removed and keys of like type stored or packaged in bulk for subsequent hand sorting and placement into a matrix arrangement where each type key occupies its ultimate calculator position. These several slow hand tasks add significantly to the cost of such calculators.

SUMMARY OF THE INVENTION

Among the several objects of the present invention may be noted the provision of method and apparatus for separating and accumulating like molded parts; the provision of a small part package; the provision of a system where small parts from a multiple cavity mold may be separated, their respective sprues cleaned off, the parts packaged, and subsequently utilized all without individual handling; the provision of a part package which also functions as a part dispenser; the provision of a package which grips individual parts therein; and the provision of a part handling system characterized by its reduction in part handling costs.

In general, a package for accumulating, storing, shipping and sequentially dispensing a plurality of uniform parts is provided in the form of an elongated sheath having a cross section of generally the same configuration as the parts with first opposed side wall portions for gripping the parts and second opposed side wall portions deformable toward one another to urge the first opposed side wall portions away from one another thereby releasing the parts.

Also in general, a plurality of part receiving tubes are disposed parallel to one another and in the same relative positions as corresponding parts occupy on a sprue and thereafter such a set of sprue supported parts are aligned with the corresponding tubes and the parts simultaneously cleaved from the sprue and forced into the respective tubes.

Still further, and in one form of the invention, a cooperating punch and die actuable by a press to sever parts from a sprue by a single press stroke is provided in conjunction with an accumulator for receiving and retaining like severed parts in a single column stacked relation along with a structure releasably holding the accumulator in alignment with the punch and die thereby allowing replacement of a filled accumulator by an empty accumulator.

BRIEF DESCRIPTION OF THE DRAWING

FIG. 3 is a sectional view along the line 3—3 of FIG. 1;

FIG. 4 is a top view of a portion of the die of FIG. 1;

FIG. 5 is an end view of one of the elongated sheath part packages from the accumulator of FIG. 1 illustrating the manner of gripping and releasing keys therein;

FIG. 6 is a view similar to FIG. 5 showing two adjacent part packages from the accumulator of FIG. 1;

FIG. 7 is a perspective view of an end plug for an elongated sheath part package; and FIG. 8 illustrates a single key which has been removed by a typical hand operation from the sprue of FIG. 2.

Corresponding reference characters indicate corresponding parts throughout the drawing and the following examples illustrate the invention in one form thereof and are not to be construed as limiting in any manner.

DESCRIPTION OF THE PREFERRED EMBODIMENT

Figure 2:
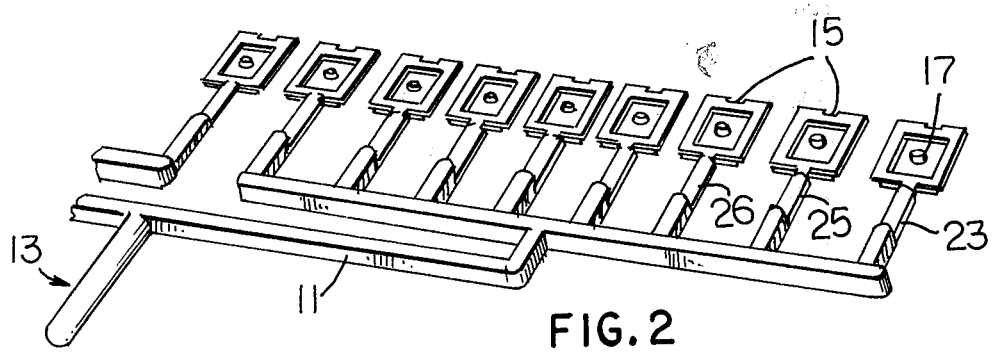
FIG. 2 is a perspective view of a plurality of molded parts supported on a common tree-like sprue.

Comparing first FIGS. 2 and 8, exemplary calculator keys are injection molded so as to be initially supported on a tree-like sprue portion 11. As is known in the injection molding art this sprue 11 is waste material corresponding to the sprue portion of the mold which couples the material source at 13 to individual mold cavities for the several keys. Individual keys happen in this particular exemplary embodiment to be of identical configuration with each key having a notch 15 and a centrally located protrusion or contact activating protuberance 17 for mechanically cooperating with other calculator parts when depressed to effect desired calculator functions. The periphery of each key is also provided with a peripheral rim or ledge 19 for engaging the underside of the calculator keyboard face plate when the key is spring loaded in its open or normal position. The front visible surface of the key may be provided with a numeral or function indicating pattern, for example, of a dissimilarly colored plastic material or a depression containing a pigment, so as to provide a readily identifiable indicia 21. The sprue 11 comprises a sequence of intermittent branches connecting to individual sprue portions such as 23 and 25 each associated with a corresponding key and mold cavity and, when individual keys are removed, a sprue remnant in the form of an irregular projecting piece 27 remains on the edge of the key to be either tolerated or preferably in the prior art removed by yet another hand operation. By utilizing the die arrangement of the present invention as described later this projection 27 may be eliminated and a second notch 29 of FIG. 5 provided.

Packaging of small parts is a recurrent problem in industry. The keys of the present illustrative embodiment and similar small parts may be stored by stacking in a column in a package in the form of an elongated sheath or tube such as 31 and 33 shown in perspective in FIG. 1 and shown in cross section perpendicular or normal to their direction of elongation in FIGS. 5 and 6. The cross sectional configuration of these elongated sheaths is generally the same as the parts to be accumulated therein and the sheath has opposed side wall portions 35 and 37 for gripping the parts due to the natural resiliency of the sheath in the direction of the arrows of FIG. 6. The sheath further has second opposed side wall portions 39 and 41 which are deformable toward one another in the direction of the arrows of FIG. 5 to urge the first opposed side wall portions 33 and 35 away from one another thereby releasing the gripped parts so that those parts may slide in the direction of elongation of the sheath. The sheath may be formed as an extruded polystyrene tube having a pair of internal lands such as 43 and 45 each of which is formed as a part of a corresponding first side wall portion 37 and 35 respectively which lands extend in the direction of elongation for engaging the respective notches 29 and 15 to help maintain the relative orientation of the parts or keys within the sheath.

To prevent the accidental discharge of parts from the individual packages, an end plug 47 of FIGS. 3 and 7 may be provided. The end of plug 47 is again of the same general cross sectional configuration as the keys and sheaths having opposed notches 49 and 51 for engaging corresponding lands within a sheath and having a leaf spring 53 which compensates for inadvertent release pressures on the sheath to prevent the inadvertent dislodgment of the plug 47 from a sheath. One or both ends of a sheath may be plugged as desired.

A variation on the package or tube useful in accumulating and in dispensing parts as well as useful in reducing possible damage to part portions such as the protrusions 17 which engage adjacent parts and which experience cumulative forces as the package fills is to make the tube cross section configuration slightly larger in all dimensions than the parts. This allows the parts to fall freely through the tube. The purpose of the plug 47 is to prevent keys from falling out of the tube and the plug may have a light friction fit inside the tube. When the tube is slightly larger than the keys so that they fit into the tube loosely enough to gravitate through, the plug may be inserted in the tube and then keys inserted one at a time forcing the plug progressively deeper into the tube. Thus the keys are easily insertable yet maintained in alignment so as to not bind in the tube. When the plug is then removed, the keys fall freely from the tube.

Figure 1:
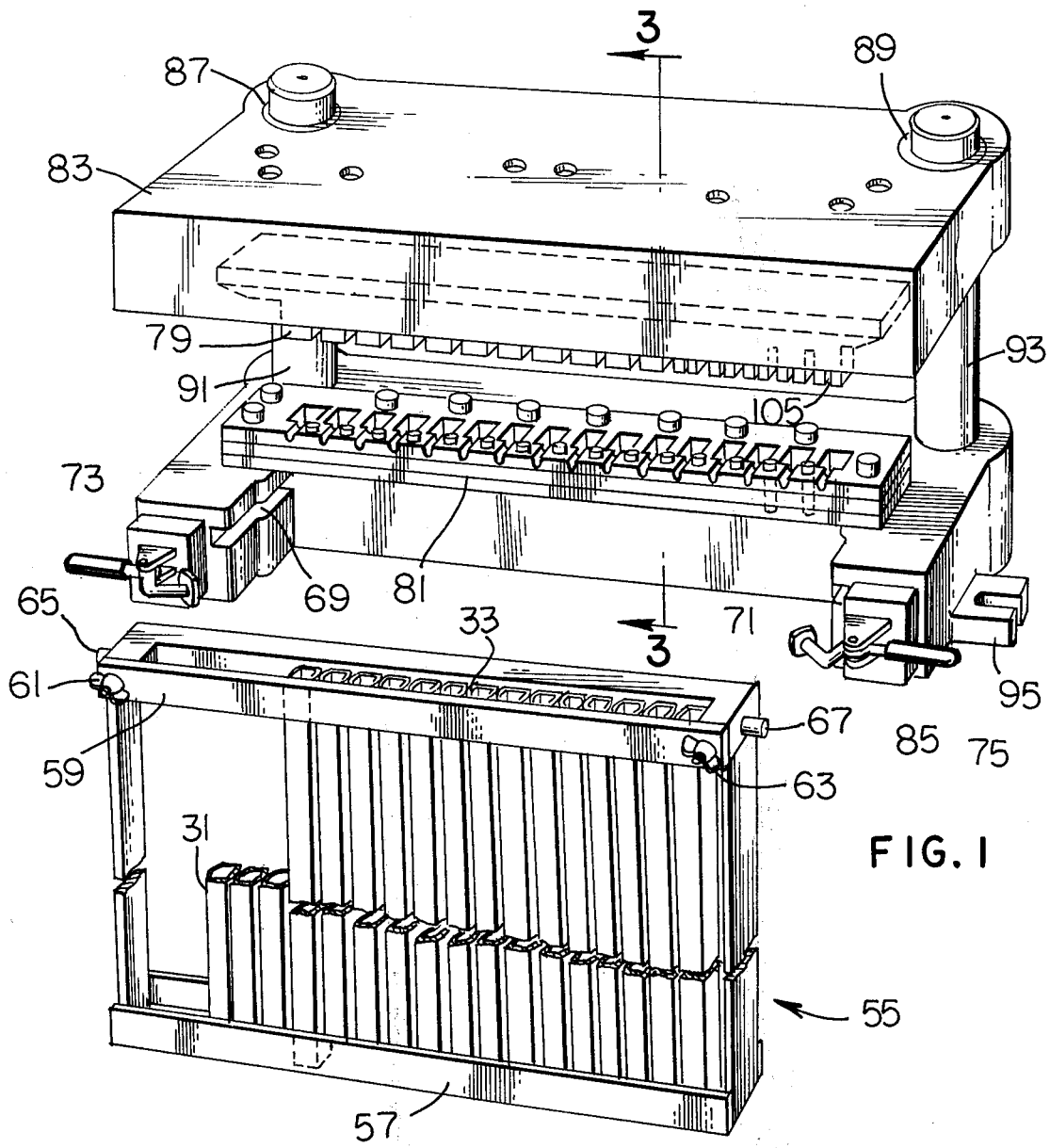
FIG. 1 is a perspective view of a punch, die and part collector or accumulator according to the present invention.

While an individual package or elongated sheath such as 31 constitutes an individual cell for receiving parts from the same molded cavity, for example, keys having a given function or numeral indicia, to stack those like parts in the package for subsequent dispensing or stripping therefrom, numerous not necessarily similar parts are simultaneously molded and supported on a sprue and it would be desirable to form a part accumulator to simultaneously receive each part from a given sprue and such an accumulator 55 is illustrated in FIG. 1. The accumulator 55 also constitutes a type of package and comprises a frame 57 having a removable portion 59 secured thereto for example by wing nuts 61 and 63. The frame functions to hold a plurality of the previously discussed elongated tubes generally parallel to one another in their direction of elongation and further in substantially the same relative position as corresponding parts occupy on the sprue 11 of FIG. 2. In one preferred form, the frame 55 compresses the several tubes slightly against one another to relieve the normal part holding pressure and allow the ready ingress of parts into their respective sheaths. The accumulator 55 has a pair of alignment studs 65 and 67 which mate with corresponding slots 69 and 71 in die support member 85 and along with means such as the clamps 73 and 75 function to releasably hold the accumulator in alignment with a punch and die arrangement for filling the accumulator.

To simultaneously cleave the several keys from their common sprue and force the keys into their respective packages in the accumulator, a die set 77 of FIGS. 1 and 3 comprising a cooperating punch 79 and die 81 is provided to sever the entire set of keys from the sprue with a single press stroke. The die set 77 is of a cantilever type configuration and is adapted for actuation by any of several conventional commercially available presses. The die set comprises a punch support plate 83 for supporting the punch 79 and a die support member 85 for supporting the die 81. The punch support plate has bushings or bearing surfaces 87 and 89 which engage respective gibs or alignment slides 91 and 93 so that the press may force the punch support plate and therefore also the punch downwardly along the alignment slide when actuated. The punch support plate 83 may be spring loaded to urge the punch and die apart as illustrated or the punch support plate may be attached to the press ram and the die support member 85 attached to the press bed for example by bolts passing through lug 95 to provide die separation when the press ram retracts.

The punch 79 and die 81 of course function to simultaneously cleave or sever all keys from the sprue and their precise cutting action is best seen from the partial top view of the die 81 illustrated in FIG. 4. The die 81 has a portion 97 which accepts the molded notch 15 and a depression 99 which accepts the sprue portion 25 while a similar depression 101 accepts an adjacent sprue portion 26. The die as viewed has an aperture of generally the same configuration as a key which in turn is generally the same as a cross section of one of the sheaths normal to its direction of elongation. A corresponding punch as viewed in FIGS. 1 and 3 has this same outline and most of the individual punch portions along with corresponding portions of the die function merely to guidingly force keys into their individual packages. However, a cutting surface or edge 103 and corresponding mating portion on the punch such as 105 in FIG. 1 functions to cut off the sprue remnant 27 and provide a key with the second notch 29.

The process of separating the contemporaneously molded parts from their common sprue and packaging those parts for subsequent utilization should now be easily understood. A plurality of the part receiving elongated tubes are arranged generally parallel to one another in their direction of elongation and in substantially the same relative positions as corresponding parts occupy on the sprue and as corresponding die apertures occupy in the die 81. The parts are simultaneously cleaved from the sprue by the interaction of the cutting edges such as 103 and 105 and forced by the protruding punch portion along the several die apertures into their respective tubes. Second and subsequent sets of sprue supported parts are sequentially placed in the die near the corresponding tubes and simultaneously cleaved from their sprue and forced into a stacked relationship with the similar previous parts to provide a stacked column of parts from the same molded cavity in each tube. The tubes are then removed from their respective locations and their ends obstructed as desired to prevent the inadvertent discharge of parts therefrom. The parts thus packaged may be stored and shipped as desired and, when it is desired to sequentially dispense the parts from their tubes, the tube obstruction is removed and that tube deformed in the direction of the arrows illustrated in FIG. 5 to dispense parts therefrom. Of course, when an accumulator or series of tubes is filled the clamps 73 and 75 are released, the accumulator removed from the support member 85 and another tube filled accumulator substituted therefor to receive keys.

From the foregoing it is now apparent that a nozzle part handling system has been presented meeting the objects, advantages and features set out hereinbefore as well as others. Numerous modifications will readily suggest themselves to those with ordinary skill in the art. For example, the applicability of the present invention to keys of a pushbutton type telephone "dialing" system as well as to a wide variety of other small part handling processes should now be apparent. As another example the accumulator 55 while illustrated as being placed and removed by hand may, to lessen dead time, be supported on a conveyor or rotating framework and indexed to remove filled packages and supply new empty packages for filling with operator accumulator handling occurring at a location apart from the punch and die. These and other variations will readily suggest themselves to those of ordinary skill in the art and accordingly the scope of the present invention is to be measured only by that of the appended claims.

What is claimed is:

1. In a punch and die press to separate molded parts from a common sprue and accumulate like separated parts from successive sprues for subsequent utilization and having cooperating punch and die means actuable by the press for severing the parts from the sprue with a single press stroke, the combination therewith of accumulator means for receiving and retaining like severed parts in a single column stacked relation;

said accumulator means comprising an elongated sheath defining a part-receiving sheath passage and having a cross-section in a plane normal to the direction of elongation of generally the same configuration as the parts; the sheath having first opposed side wall portions for gripping the parts and second opposed side wall portions deformable toward one another to urge the first opposed side wall portions away from one another and release parts gripped therebetween.

2. The apparatus of claim 1 including retaining means for holding in slightly compressed relation a plurality of said sheaths in parallel alignment; said second opposed side wall portions of each sheath being contiguous with second wall portions of the next adjacent sheaths in said alignment, whereby said first side wall portions in said sheaths are urged away from one another to receive in free sliding relation the severed parts from said press.

3. The apparatus of claim 2 including holding means for releasably holding said retaining means and said sheaths in part receiving relation to said press.

4. The apparatus of claim 2 including plug means longitudinally movable in said passage for removably plugging said sheath passage to prevent inadvertent removal of parts from said sheath.

5. The apparatus of claim 4 wherein said plug means comprises a body having the same general cross-section in a plane normal to the elongation as the part cross-section; a resilient member attached to said body and extending in a direction transverse to said sheath to resiliently and frictionally engage a sheath wall portion whereby said plug means is longitudinally and incrementally movable downwardly in said sheaths against the frictional force between said resilient member and said wall portion as said parts are accumulated in said sheath.

6. The apparatus of claim 1 wherein the sheath comprises an extruded polystyrene tube having a pair of internal lands extending in the direction of elongation for engaging parts to maintain the relative orientation of parts within the sheath.

7. The apparatus of claim 6 wherein the internal lands are each formed as part of a corresponding first side wall portion.

8. The apparatus of claim 1 wherein the sheath comprises an extruded tube having internal land portions formed on respective ones of the first side wall portions and extending therealong in the direction of elongation.

* * * * *